US006691238B1

United States Patent
Forbes et al.

(10) Patent No.: US 6,691,238 B1
(45) Date of Patent: Feb. 10, 2004

(54) SYSTEM FOR DISABLING REMOTE WAKE EVENTS ON A REMOTE WAKE LINE THAT IS COUPLED TO A FRONT PANEL SWITCH WAKE LINE

(75) Inventors: Brian S. Forbes, Portland, OR (US); Robert O. Bruckner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,519

(22) Filed: Mar. 30, 2000

Related U.S. Application Data

(63) Continuation-in-part of application No. 09/360,364, filed on Jul. 23, 1999.

(51) Int. Cl.$^7$ .................................................. G06F 1/32
(52) U.S. Cl. ....................................... 713/323; 713/320
(58) Field of Search .............................. 713/300, 310, 713/323, 320

(56) References Cited

U.S. PATENT DOCUMENTS

| | | | | |
|---|---|---|---|---|
| 5,664,204 A | * | 9/1997 | Wang | 713/300 |
| 5,962,930 A | * | 10/1999 | Cluff et al. | 307/66 |
| 6,141,021 A | * | 10/2000 | Bickford et al. | 345/503 |
| 6,219,742 B1 | * | 4/2001 | Stanley | 710/260 |
| 6,243,821 B1 | * | 6/2001 | Reneris | 713/323 |
| 6,272,645 B1 | * | 8/2001 | Wang | 713/323 |
| 6,448,988 B1 | * | 9/2002 | Haitani et al. | 345/840 |
| 6,477,655 B1 | * | 11/2002 | Delvaux et al. | 713/323 |

* cited by examiner

Primary Examiner—Thomas Lee
Assistant Examiner—Paul Yanchus, III
(74) Attorney, Agent, or Firm—Kenyon & Kenyon

(57) ABSTRACT

A computer includes two signal lines on which wake events can occur, but the computer's motherboard recognizes wake signals occurring on only one of these signal lines. Therefore, the computer includes a circuit that, in response a wake event on the signal line that is not recognized by the motherboard, delivers a wake signal over the signal line that is recognized by the motherboard unless prevented from delivering the signal by a disable element.

11 Claims, 3 Drawing Sheets

SYSTEM FOR DISABLING REMOTE WAKE EVENTS ON A REMOTE WAKE LINE THAT IS COUPLED TO A FRONT PANEL SWITCH WAKE LINE

CROSS-REFERENCE TO RELATED APPLICATION

This application is a continuation-in-part of U.S. patent application Ser. No. 09/360,364, which was filed on Jul. 23, 1999, and is entitled "USING A HARDWARE-DRIVEN EVENT TO WAKE A COMPUTER FROM A SLEEPING STATE."

TECHNOLOGICAL FIELD

This application relates to waking a computer system from a sleeping state.

BACKGROUND

Many IBM-compatible personal computer (PC) systems incorporate some form of power management scheme that allows the computer to "shut down" without losing system context. One such scheme is defined in the "Advanced Power Management Specification" ("APM Specification"), version 1.2, published by Intel Corporation and Microsoft Corporation in February 1996. The APM Specification allows three basic power management states: (1) an "ON" state in which the computer operates at full power with full system context; (2) a "SUSPEND" state in which the computer shuts down but preserves system context and continues to consume power in reduced amounts; and (3) an "OFF" state in which the computer shuts down completely, erasing system context and consuming very little, if any, power. Power management under the APM Specification is human-directed power management, meaning that a human user usually decides which of the states the computer will enter at any given moment by activating one or more buttons or switches on the computer.

A later power management specification, the "Advanced Configuration and Power Interface Specification" ("ACPI Specification"), version 1.0b, published by Intel Corporation, Microsoft Corporation, and Toshiba K.K. in February 1999, vests primary control of power management in the computer's operating system (OS). The ACPI Specification defines several sleeping states that involve varying levels of power consumption and system context preservation. Two of these states, known as the "S4" or "Suspend-to-Disk" state and the "S5" or "Soft-Off" state, cause the computer to undergo a full shut-down sequence and reduce power consumption to very small, stand-by levels. The "S4" state preserves only the OS configuration when shutting down the computer, storing configuration information to the computer's hard drive. In the "S5" sleeping state, all system context is lost. In both of these states, power is removed from the computer's processor and main memory, and only a very small amount of stand-by power is provided to the computer's wake circuitry. Awaking from both the "S4" and the "S5" sleeping states requires the computer to undergo a full booting process.

The ACPI Specification does not allow the operating system to wake the computer from either the "S4" or "S5" state. As a result, the Microsoft Windows 98 operating system was designed to disable all wake events other than those generated by a "Sleep" button or power switch on the computer's front panel when the computer is in the "S4" or "S5" state. The ACPI Specification does not preclude responding to "S4" or "S5" wake events from other hardware components in the computer, such as signals received from other computers through a modem or network interface card (NIC), but the Windows 98 operating system does not accommodate other hardware-driven wake events.

Based on the foregoing, there is a need for systems and techniques that allow events to wake a computer system from a sleeping state. Moreover, because such systems and techniques may not be needed by all users, there is a need to be able to disable the systems and techniques that allow events to wake a computer system from a sleeping state.

DETAILED DESCRIPTION

The systems and techniques described here allow hardware-driven events to wake a computer system from a sleeping state from which the computer must undergo a full booting process. The invention is useful, for example, in supporting "S4" and "S5" wake events from PCI-compliant devices in an ACPI-compliant computer running Windows 98. Support of hardware-driven wake events allows remote waking of a computer system through events such as modem rings and queries from a network administrator.

The invention involves waking a computer from a sleeping state. The computer includes two signal lines on which wake events can occur, but the computer's motherboard recognizes wake signals occurring on only one of these signal lines. Therefore, the computer includes a circuit that, in response a wake event on the signal line that is not recognized by the motherboard, delivers a wake signal over the signal line that is recognized by the motherboard.

Figure 1:
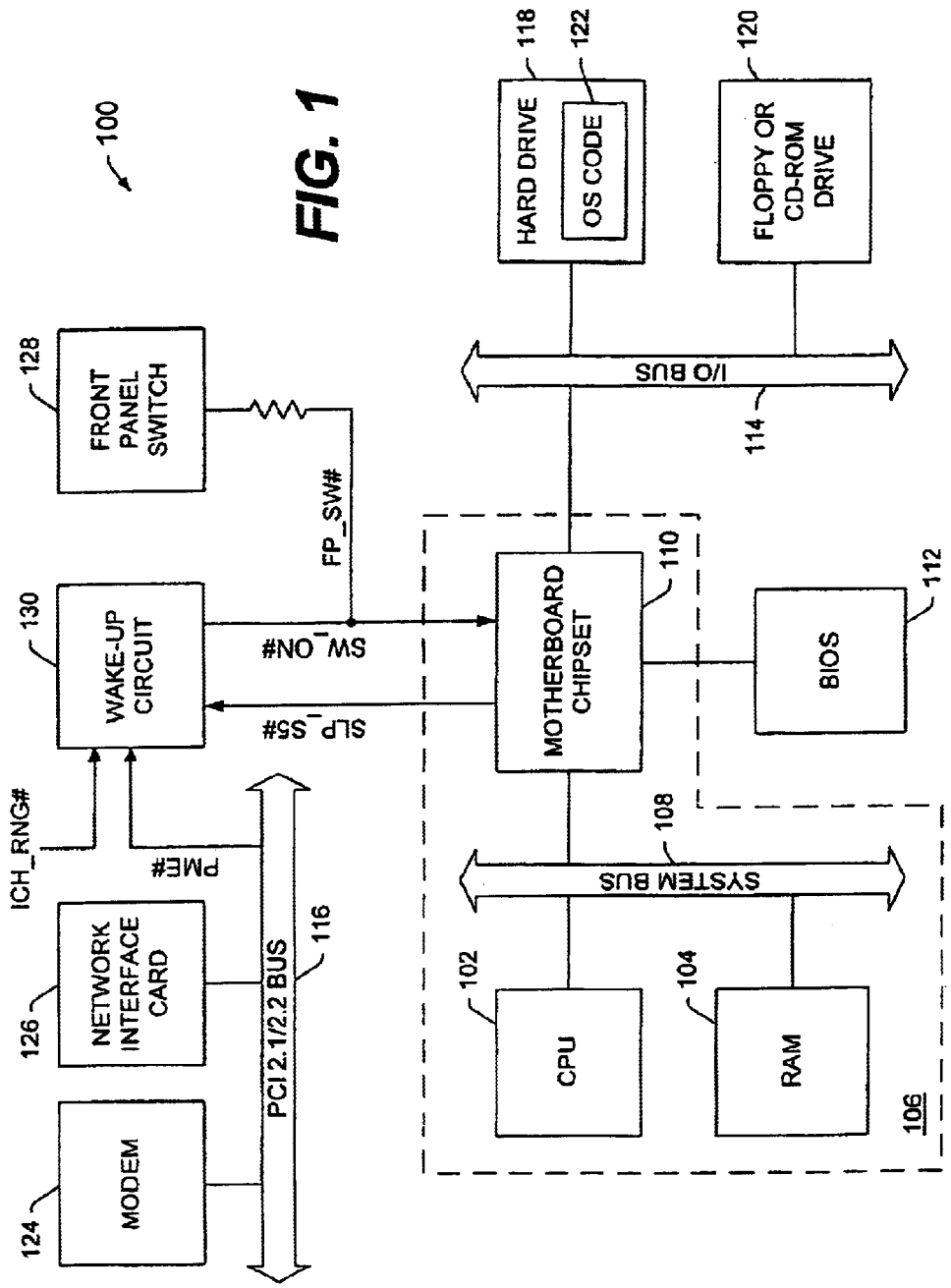
FIG. 1 is a partial block diagram of a computer system that supports hardware-driven wake events.

FIG. 1 shows a computer system 100 that supports remote, hardware-driven wake events from the ACPI "S4" and "S5" sleeping states. The computer system 100 includes at least one central processing unit (CPU) 102, or processor, and a memory unit 104, such as random access memory (RAM), mounted to a motherboard 106. In many systems, the processor 102 and the memory unit 104 reside on separate printed circuit cards that mount to the motherboard 106. A system bus 108 on the motherboard 106 provides a communication path between the processor 102 and the memory unit 104.

A motherboard chipset 110 manages interaction between the system bus 108 and other system components, such as the computer's basic input/output system (BIOS) component 112 and peripheral components like those described below. The motherboard chipset 110 includes a system address and data controller, which performs what is known as "northbridge functionality," and an input/output controller hub (ICH), which performs what is known as "southbridge functionality." The motherboard chipset 110 also generates control signals that cause the computer to enter and exit one or more sleeping states, such as the ACPI "S4" and "S5" states. When the computer is in the ACPI "S4" or "S5" sleeping state, the motherboard chipset 110 asserts an active-low sleep signal (SLP_S5#). The chipset 110 keeps this signal deasserted when the system is in any other state.

The computer system 100 also includes one or more data buses that support communication between the motherboard 106 and one or more peripheral components. One such bus is an I/O bus 114, on which the computer's hard drive 118 and floppy/CD-ROM drives 120 reside. The hard drive 118 stores, among other things, the computer's operating system (OS) code 122, which, upon boot-up, is loaded into the computer's memory unit 108 for execution by the processor 102.

Another type of data bus often found in the computer system 100 is a peripheral component interface (PCI) bus 116 that complies with the "PCI Local Bus Specification Rev. 2.1" ("PCI 2.1"), published on Jun. 1, 1995, or the "PCI Local Bus Specification Rev. 2.2" ("PCI 2.2"), published on Dec. 18, 1998, by the PCI Special Interest Group. One or more PCI 2.1/2.2 compliant peripheral devices, such as a modem 124 and a network interface card (NIC) 126, connect to the PCI bus 116. The modem 124 usually ties the computer system 100 to a public switched telephone network (PSTN) or to a cable network, and the network interface card 126 usually ties the computer system 100 to a local or wide area computer network.

PCI 2.1/2.2 compliant devices are designed to respond to certain events initiated remotely, such as an incoming telephone call or a query from a network administrator. Upon detecting a remote event, a PCI 2.1/2.2 compliant device asserts a power management signal (PME#) that is used to wake a sleeping computer system. Likewise, a PCI device that complies with some earlier version of the PCI Specification, such as version 2.0, asserts a ring signal (ICH_RNG#) upon detecting a remote event. However, if the computer is in either the ACPI "S4" or "S5" sleeping state, the Windows 98 operating system does not recognize assertion of the PME# or ICH_RNG# signal as a remote wake event. The Windows 98 platform allows the computer to awaken from the "S4" and "S5" sleeping states only in response to a signal (FP_SW#) asserted over a first wake line by the computer's front panel power switch 128.

To remedy this limitation of the Windows 98 platform, the computer system 100 takes advantage of the fact that the ACPI Specification prohibits only software-initiated wake events (such as the PME# or ICH-RING# signals) in the "S4" and "S5" sleeping states. The system 100 includes a wake-up circuit 130 that supports hardware-driven events over a second wake line from components other than the front panel power switch 128. The wake-up circuit 130 generates an interrupt signal (SW_ON#) that is combined as an output line with the FP_SW# signal from the front panel power switch 128 and delivered over a computer wake line to the motherboard chipset 110. One technique for combining the two signals involves connecting a resistor 135 between the front panel power switch 128 and the wake-up circuit 130 to create a wire-OR circuit between the FP_SW# and SW_ON# signals. Combining the signals in this manner ensures that the FP_SW# pin of the motherboard chipset 110 is driven when either the FP_SW# signal or the SW_ON# signal asserted. This causes the operating system to treat the PME# and ICH_RNG# signals from PCI-compliant devices as signals from the front panel power switch 128. As a result, the computer system 100 awakens from the "S4" and "S5" sleeping states in response to remote wake events detected by PCI-compliant devices.

Figure 2:
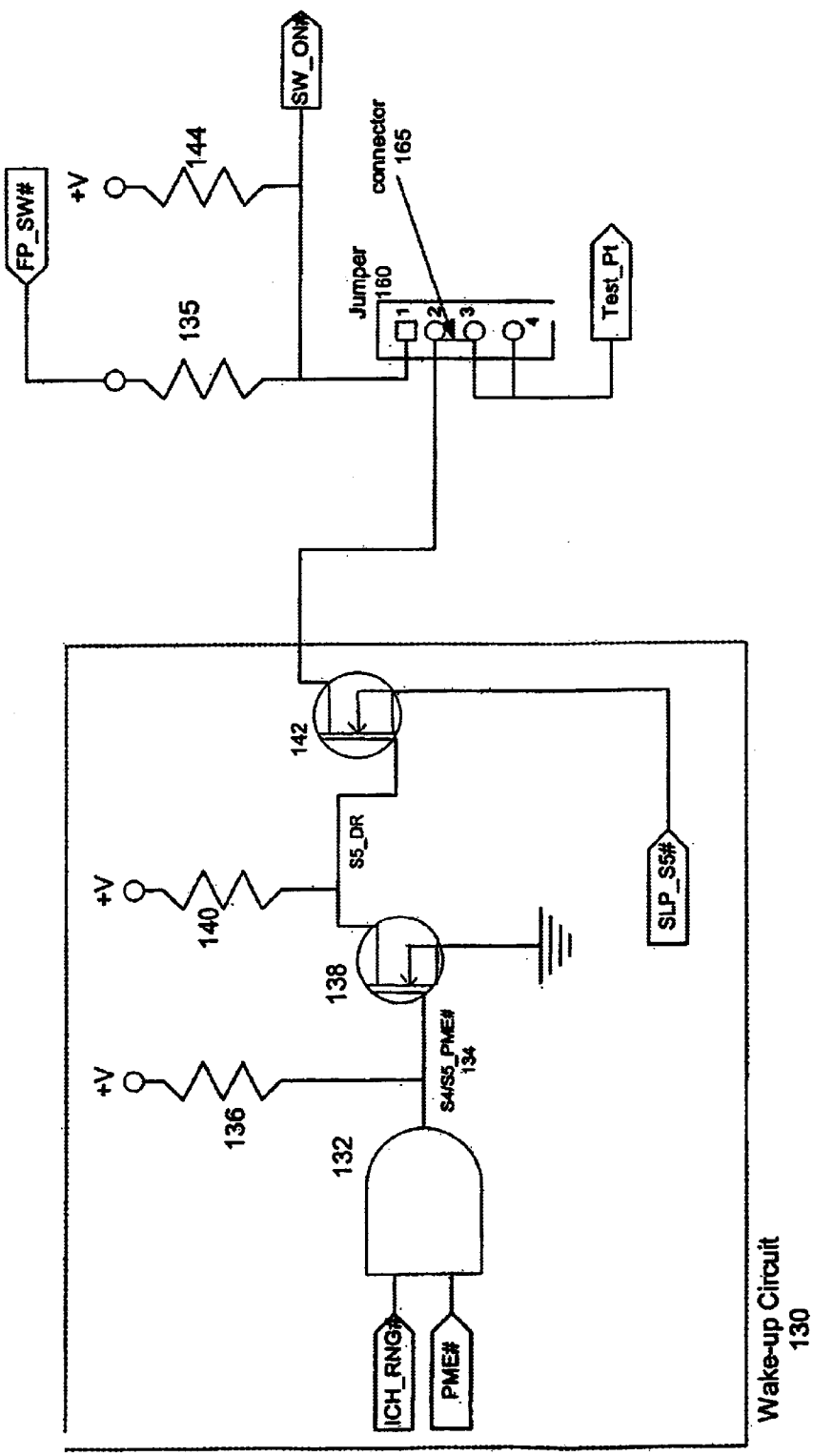
FIG. 2 is a schematic diagram of a circuit that propagates hardware-driven wake events to the computer's motherboard according to one embodiment in which wake-events may be disabled.

FIG. 2 shows one implementation of the wake-up circuit 130 and includes one embodiment of a disable element that may be used to disable wake events. In this implementation, the circuit 130 receives the PME# and ICH_RNG# signals from PCI-compliant devices and the SLP_S5# signal from the motherboard chipset 110. The circuit 130 includes an AND gate 132 that receives the active-low PME# and ICH_RNG# signals and asserts an active-low signal (S4/S5_PME#) on an output line 134 when either of the input signals is asserted. The output line 134 from the AND gate 132 connects to a pull-up resistor 136 and to the gate of a switching transistor 138, such as an n-channel FET. The source of this transistor 138 connects to a low-voltage node, such as ground. The drain connects to a pull-up resistor 140 and asserts an active low (S5_DR) to the gate of an output transistor 142, such as an n-channel FET. The source of the output transistor 142 may receive the SLP_S5# signal.

Figure 3:
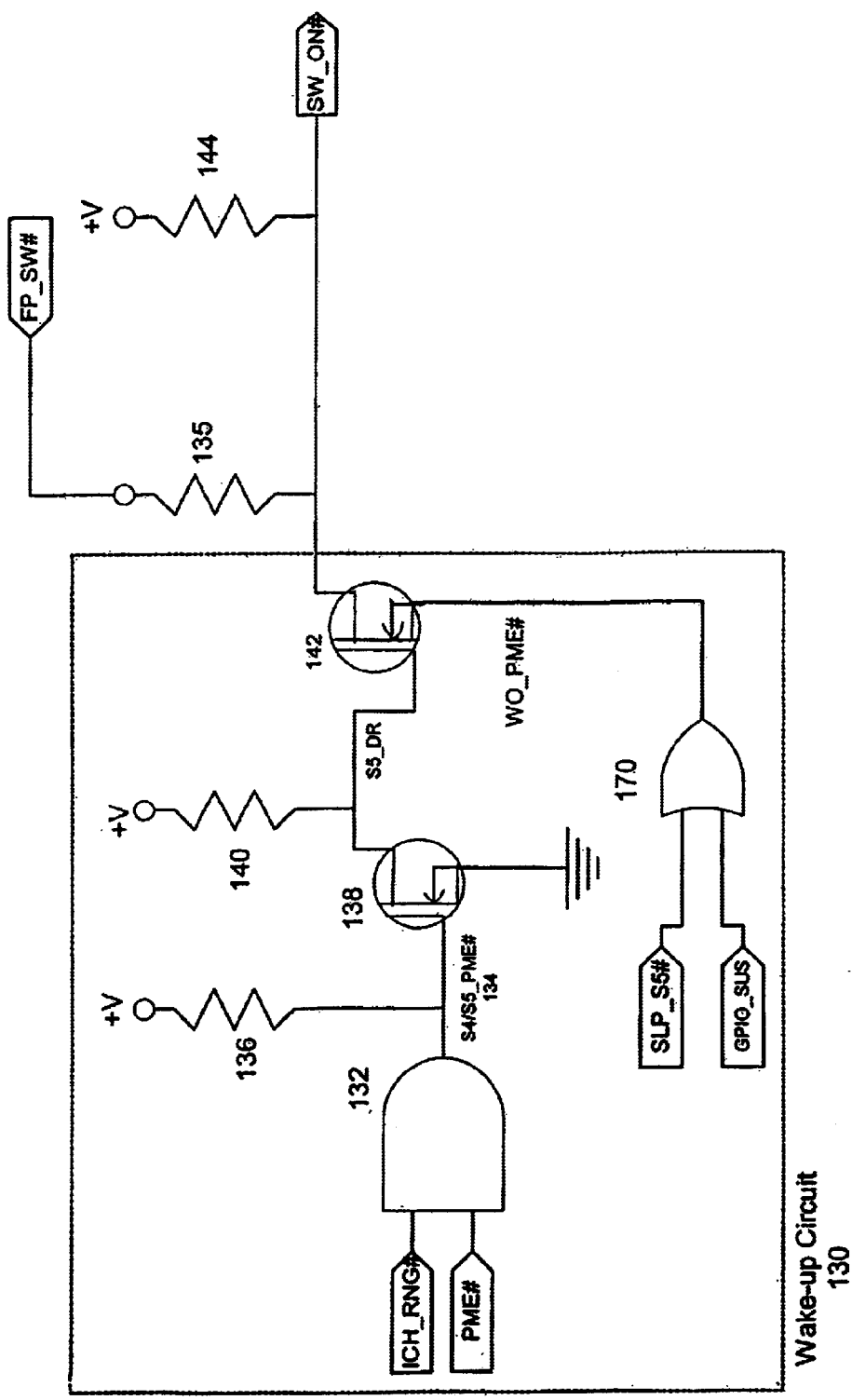
FIG. 3 is a schematic diagram of a circuit that propagates hardware-driven wake events to the computer's motherboard according to another embodiment in which wake-events may be disabled.

In one embodiment (not shown in FIG. 2) that does not permit the disabling of wake events, the drain of the output transistor 142 may be connected to the resistor 135 that forms the wire-OR circuit between the FP_SW# signal and the SW_ON# signal. In this embodiment, the drain drives the SW_ON# signal and is connected to a pull-up resistor 144 to complete the wire-OR circuit. FIG. 3 provides an illustration of this arrangement of transistor 142, resistor 135, resistor 144, and the SW_ON# signal line.

FIG. 2 shows an embodiment of the circuit that permit the disabling of wake events. This embodiment includes disable element 160, which is shown in FIG. 2 as a jumper. In this embodiment, the drain of the output transistor 142 drives disable element 160. It also drives the resistor 135 that forms the wire-OR circuit. Disable element 160 divides the signal line between wake circuit 130 and motherboard chipset 110 into two sections. One end of the first section may connect to transistor 142 of wake circuit 130, and the second end of this section may connect to disable element 160. A first end of the other section may connect to disable element 160, with the second end of this section connected to motherboard chipset 110.

Jumper 160 is shown in FIG. 2 as having four pins numbered 1 to 4 but may be any type of conventional jumper. In the embodiment shown, the drain of the output transistor 142 is connected to pin 2 of jumper 160. Pin 1 of jumper 160 is connected to pull-up resistor 144 and signal line SW_ON# to complete the wire-OR circuit. Disable element 160 is shown in FIG. 2 as a jumper but may be any other type of switching element that may for example switch from a first state to a second state, one example being a DIM switch. In a further embodiment, disable element 160 may be a resistor (not shown) having a resistance of zero ohms that may be removed from the circuit. When the resistor is present, wake-up circuit 130 is enabled because a signal may pass between transistor 142 and signal line SW_ON#. When the resistor is removed, wake-up circuit 130 is disabled because a signal may not pass between transistor 142 and signal line SW_$_{ON\#}$ In this first embodiment for permitting the disabling of wake events, jumper 160 is used as a switch to disable signals passing from wake-up circuit 130 and front panel switch 128 (represented by FP_SW# in FIG. 2) to motherboard chipset 110 (represented by SW_ON# in FIG. 2). The wake-up circuit in the implementation shown in FIG. 2 is enabled when pin 1 of jumper 160 is connected to pin 2 of the jumper. In this case, the two sections of signal line SW_ON# are connected, and signal line SW_ON# may be driven by the drain of transistor 142 (through jumper 160). When pin one is connected to pin 2, the disable element is the waking enabled state. The wake-up circuit in the implementation shown in FIG. 2 is disabled when pin 1 is not connected to pin 2, in which case signal line SW_ON# is always high and always inactive. In this case, the disable element is in the waking disabled state. In one embodiment, shown in FIG. 2, pin 2 may be connected to pin 3 (instead of pin 1) by connector 165 when disabling wake-circuit 130. Pin 3 and pin 4 may be connected to a test point, which designates a line that does not lead anywhere.

FIG. 3 shows a second embodiment of a circuit similar to that of FIG. 2 which permits the disabling of wake events by using a disable signal line which may be recognized by wake-up circuit 130 as disabling the sending of a wake signal. As discussed above, the embodiment shown in FIG. 3 does not include the disable element 160, resistor 161 and associated elements that are shown in FIG. 2. The embodiment shown in FIG. 3 is also different in that the source of output transistor 142 receives the SLP_S5# signal line combined with a disable signal line. The disable signal line may be a signal line that is connected to an output of the BIOS. In a further embodiment, the state of the disable signal may be modified by changing the values of one or more variables in the CMOS setup utility. Such a change may be made, for example, at boot time. In a still further embodiment, shown in FIG. 3, the disable signal line may be connected to the GPIO_SUS signal line, which may reside on the Suspend well. The disable element is in the waking enabled state when the disable signal line not asserted, and the disable element is in the waking disabled state when the disable line is asserted.

The disable signal line may be combined with the SLP_S5# signal line using a logic gate such as OR gate 170 shown in FIG. 3. In this embodiment, the SLP_S5# signal and the GPIO_SUS signal are inputs to OR gate 170, and the output of OR gate 170 (WO_PME#) is connected to the source of output transistor 142. This disable signal line may be used to deactivate transistor 142 when a disable signal is present on the disable signal line. When a disable signal is not asserted, it permits the combining of the signal from wake-up circuit 130 and the signal that is recognized by the computer as causing a wake event. In this embodiment, wake-up circuit 130 is not active, and cannot wake-up computer system 100, when the SLP_S5# signal is not asserted (in which case the computer system 100 is already awake) or when GPIO_SUS is asserted. Thus, in this embodiment, the signal from wake-up circuit 130 and the signal that is recognized by the computer as causing a wake event will not be combined when the computer is in the sleeping state.

The truth table below illustrates the operation of the embodiment of wake-up circuit 130 shown in FIG. 3. In the first case shown in row 1, ICH_RNG# and PME# are both active, indicating that the unit (computer system 100) is being polled for a wake event, and AND gate 132 asserts the S4/S5_MPE# signal. WO_PME# is active because the GPIO_SUS signal is inactive (i.e., GPIO_SUS has not disabled wake events) and the SLP_S5# signal from the motherboard chipset 110 is asserted (the computer system 100 is in either the "S4" or the "S5" sleeping state). This causes the output transistor 142 to assert the SW_ON# signal, which wakes computer system 100.

In the second case, the unit is again being polled for a wake event (ICH_RNG# is active). In this case, however, SLP_S5# is not asserted because computer system 100 is fully on. Because SLP_S5# is not asserted, WO_PME# is inactive, SW_ON# is inactive, and wake-up circuit 130 has no effect on the system.

In the third case, the unit is again being polled for a wake event (PME# is active). In addition, the SLP_S5# signal from the motherboard chipset 110 is asserted because the computer system 100 is in either the "S4" or the "S5" sleeping state. However, in this case the GPIO_SUS signal is asserted high, thus disabling wake events. The active GPIO_SUS signal causes an inactive WO_PME# signal, which causes SW_ON# to be inactive, and wake-up circuit 130 has no effect on the system.

In the fourth case, the unit is not being polled for a wake event, the SLP_S5# signal from the motherboard chipset 110 is not asserted because the unit is not in the "S4" or "S5" sleeping state, and the GPIO_SUS signal is asserted high (thus disabling wake events). For all of these reasons, SW_ON# is inactive, and wake-up circuit 130 has no effect on the system.

Finally, in the fifth case, the unit is in a sleeping state (SLP_S5 is inactive) and GPIO_SUS has not disabled wake events. Thus, the WO_PME# signal is active. However, the unit is not being polled for a wake event, and thus SW_ON# is inactive and wake-up circuit 130 has no effect on the system.

|   | ICH_RNG# | PME# | S4/S5_PME# | S5_DRV | GPIO_SUS | SLP_S5# | WO_PME# | SW_ON# |
|---|---|---|---|---|---|---|---|---|
| 1 | 0 | 0 | 0 | 1 | 0 | 0 | 0 | 0 |
| 2 | 0 | 1 | 0 | 1 | 0 | 1 | 1 | 1 |
| 3 | 1 | 0 | 0 | 1 | 1 | 0 | 1 | 1 |
| 4 | 1 | 1 | 1 | 0 | 1 | 1 | 1 | 1 |
| 5 | 1 | 1 | 1 | 0 | 0 | 0 | 0 | 1 |

*All signals designated by "#" are active low.

A person of skill in the art will appreciate that the truth table described above does not illustrate all possible cases, but that the truth table does adequately describe the operation of the system shown in FIG. 3. That is, a person of skill in the art would appreciate that because the SW-ON# signal connects to the FP_SW# pin of the motherboard chipset 110, and because the SW_ON# signal and the FP_SW# signal are connected by a wire-OR circuit, the FP_SW# pin on the motherboard chipset 110 is asserted when either the output transistor 142 or the front panel power switch 128 asserts its respective output line. Further, output transistor 142 asserts its output line only when disable line GPIO_SUS is not active. As a result, remote wake signals generated by hardware devices other than the front panel switch are used to wake the computer system 100 from the "S4" and "S5" sleeping states if GPIO_SUS is not active.

Other embodiments are within the scope of the following claims. For example, some computer systems may include the wake-up circuits that allow hardware-driven events from devices other than PCI-compliant devices to wake the computer from the "S4" and "S5" sleeping states. Moreover, in some systems the wake-up circuit may allow wake events for sleeping states other than the ACPI "S4" and "S5" sleeping states described here. The wake-up circuits shown in FIGS. 2 and 3 are only two of many circuits that are useful in supporting hardware-driven wake events. For example, an embodiment that permits the disabling of wake events might include the disable element 160 and resistor 161 (as shown in FIG. 2) in addition to the disable signal line and associated elements (as shown in FIG. 3). In some embodiments, the wake-up circuit is placed on a peripheral card with a wire to the front panel signal line.

What is claimed is:

1. A computer system comprising:
   a processor and a main memory unit;
   a control element that instructs the processor and the main memory unit to enter a sleeping state;
   a disable element to disable wake events from waking up the system when the disable element is in a waking disabled state, wherein the disable element also has a waking enabled state;
   a front panel switch operable to generate a wake event during the sleeping state;
   a wake signal line driven by the front panel switch;
   an operating system that disables recognition of all wake events during the sleeping state other than wake events appearing on the wake signal line;
   at least one hardware component other than the front panel switch that is operable to generate a wake event during the sleeping state; and
   a wake circuit that places the wake event from said hardware component onto the wake signal line if both the processor is in the sleeping state and the disable element is in the waking enabled state,
   wherein the disable element comprises a disable signal line, and wherein the disable signal line is connected to a BIOS component.

2. The system of claim 1, wherein the wake circuit generates a wake event on the wake signal line upon receiving a wake event from either the front panel switch or the hardware component.

3. The system of claim 1, further comprising a sleep signal that activates the wake circuit only during the sleeping state, and wherein the control element drives the sleep signal.

4. The system of claim 1, wherein the disable element comprises a disable signal line, and wherein the disable signal line is connected to a GPIO_SUS signal.

5. A circuit comprising:
   a front panel switch wake input line to transmit a front panel switch wake signal to an operating system;
   a remote wake event input line to transmit a wake event signal from a remote device to the operating system, wherein the remote wake event signal line is coupled to the front panel switch signal line so that a remote wake event input signal is treated by the operating system as a front panel switch wake signal; and
   a disable element coupled to the remote wake event input line to disable remote wake event signals from waking up the system.

6. The circuit of claim 5, wherein the disable element includes a switching element having at least a first state and a second state.

7. The circuit of claim 6, wherein the disable element includes a jumper comprising a first pin and a second pin.

8. The circuit of claim 6, wherein the disable element comprises a DIM switch.

9. The circuit of claim 5, wherein the disable element includes a disable signal line.

10. The circuit of claim 9, wherein the disable element includes a switching element that disconnects the remote wake event input line from the front panel switch wake input line when a disable signal is present on the disable signal line.

11. The circuit of claim 10, wherein:
   the disable element includes a FET between the remote wake event input line and the front panel switch wake input line; and
   the FET has a source node that is active only when the disable signal is not asserted.

* * * * *